(12) United States Patent
Murai et al.

(10) Patent No.: US 12,351,241 B2
(45) Date of Patent: Jul. 8, 2025

(54) VEHICLE STRENGTHENING MEMBER

(71) Applicant: TOYODA IRON WORKS CO., LTD., Toyota (JP)

(72) Inventors: Makoto Murai, Toyota (JP); Haruaki Nabeshima, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 369 days.

(21) Appl. No.: 17/919,477

(22) PCT Filed: Apr. 16, 2021

(86) PCT No.: PCT/JP2021/015697
§ 371 (c)(1),
(2) Date: Oct. 17, 2022

(87) PCT Pub. No.: WO2021/210670
PCT Pub. Date: Oct. 21, 2021

(65) Prior Publication Data
US 2023/0159108 A1 May 25, 2023

(30) Foreign Application Priority Data
Apr. 16, 2020 (JP) ................................ 2020-073269

(51) Int. Cl.
*B62D 25/06* (2006.01)
(52) U.S. Cl.
CPC .................... *B62D 25/06* (2013.01)

(58) Field of Classification Search
CPC ................................................... B62D 37/02
See application file for complete search history.

(56) References Cited

U.S. PATENT DOCUMENTS

| 9,452,724 B2 * | 9/2016 | Nilsson ................... B60R 19/44 |
| 10,933,918 B2 * | 3/2021 | Koreishi ................ B62D 25/06 |

(Continued)

FOREIGN PATENT DOCUMENTS

| DE | 11 2016 000 651 T5 | 10/2017 |
| JP | H10-236236 A | 9/1998 |

(Continued)

OTHER PUBLICATIONS

Jun. 22, 2021 International Search Report issued in International Patent Application No. PCT/JP2021/015697.

(Continued)

*Primary Examiner* — Lori Lyjak
(74) *Attorney, Agent, or Firm* — Oliff PLC

(57) ABSTRACT

A vehicle strengthening member includes a top wall and a pair of lateral walls so that the vehicle strengthening member has a hat-shaped cross section. The vehicle strengthening member further includes a plurality of bend portions each of which is bent along a fold line extending in a transverse direction so that the vehicle strengthening member is curved as a whole. The top wall includes a recess extending in a (Continued)

longitudinal direction along a center of the top wall. The top wall also includes a pair of ridges extending in the longitudinal direction on lateral sides of the recess. The top wall further includes at least one raised bead formed in the recess at a position corresponding to each of the bend portions, each raised bead extending in the transverse direction. Each raised bead comprises ends, each of which is joined to a side of the ridge.

20 Claims, 12 Drawing Sheets

(56) References Cited

U.S. PATENT DOCUMENTS

| | | | | |
|---|---|---|---|---|
| 2011/0133521 | A1* | 6/2011 | Yu .......................... | B62D 25/06 296/210 |
| 2013/0119680 | A1* | 5/2013 | Kosaka ................... | B60R 19/18 293/102 |
| 2015/0273563 | A1* | 10/2015 | Miyagi ................... | B21D 22/22 29/897.2 |
| 2016/0288840 | A1* | 10/2016 | Valencia Carrio ..... | B62D 21/15 |
| 2017/0305470 | A1* | 10/2017 | Sato ....................... | B62D 25/04 |

FOREIGN PATENT DOCUMENTS

| | | |
|---|---|---|
| JP | 2008-195361 A | 8/2008 |
| JP | 2011-219001 A | 11/2011 |
| JP | 2014-058224 A | 4/2014 |
| JP | 2015-131557 A | 7/2015 |
| JP | 2016-540678 A | 12/2016 |
| JP | 2019-077381 A | 5/2019 |
| WO | 2014/050973 A1 | 4/2014 |

OTHER PUBLICATIONS

Oct. 21, 2024 Notice of Reexamination issued in Chinese Patent Application No. 202180028365.3.
Zhang Zhong et al., "Fundamentals of Engineering Materials and Forming Processes", Aviation Industry Press, (2019), p. 184.
Engineering Drawing textbook writing group, "Geometric Drawing and Engineering Drawing (for Electronics and Communications Majors)", People's Post and Telecommunications Press, (1981), pp. 242-243.
May 26, 2023 Office Action issued in Chinese Patent Application No. 202180028365.3.
May 7, 2024 Extended Search Report issued in European Patent Application No. 21787976.6.

* cited by examiner

VEHICLE STRENGTHENING MEMBER

CROSS-REFERENCE TO RELATED APPLICATIONS

The present application is a U.S. National Phase entry of, and claims priority to, PCT Application PCT/JP2021/015697, filed Apr. 16, 2021, which claims priority to Japanese Patent Application No. 2020-073269, filed Apr. 16, 2020, both of which are incorporated herein by reference in their entireties for all purposes.

TECHNICAL FIELD

The present disclosure relates to a vehicle strengthening member for a roof center reinforcement, front bumper, or other component of a vehicle body.

BACKGROUND

The roof of a vehicle includes a strengthening member known as a roof center reinforcement, which is located at a position between the right and left center pillars. The roof center reinforcement has a generally hat-shaped cross section perpendicular to its longitudinal direction, and extends between the left and right center pillars. The roof center reinforcement has a plurality of bend portions along the longitudinal direction, and is formed in a curved shape so that the height from the vehicle floor is larger at the central portion in its longitudinal direction.

SUMMARY

The above-mentioned roof center reinforcement is formed by pressing sheet steel. However, a problem may arise in that the product cannot be manufactured with high accuracy because of spring back which occurs during the press forming process. It is thus desirable to reduce the amount of spring back when a strengthening member is press formed.

One aspect is a vehicle strengthening member, comprising a top wall and a pair of lateral walls, so that the vehicle strengthening member has a hat-shaped cross section. The vehicle strengthening member further includes a plurality of bend portions bent along a fold line extending in a transverse direction so that the vehicle strengthening member is curved as a whole. The top wall includes a recess extending in a longitudinal direction and along a center of the top wall. The top wall also includes a pair of ridges extending in the longitudinal direction and along lateral sides of the recess. The top wall includes at least one raised bead in the recess. Each raised bead is at a position corresponding to each of the bend portions, each raised bead extending in the transverse direction. Each raised bead comprises ends, each of which is joined to a side of the ridge.

In some embodiments, each ridge comprises a recessed bead extending along the longitudinal direction and is at a position corresponding to each of the bend portions.

In some embodiments, the at least one raised bead corresponding to the associated bend portion comprises one raised bead positioned across the fold line.

In some embodiments, the fold line of each of the bend portions is interrupted by the corresponding raised bead, and a top of the raised bead comprises a flat surface.

In some embodiments, the at least one raised bead corresponding to the associated bend portion comprises two raised beads positioned between the two recessed beads associated with the same bend portion. The two raised beads are disposed on opposite sides of the corresponding fold line.

In some embodiments, the vehicle strengthening member is a roof center reinforcement. The top wall of the vehicle strengthening member is positioned on an inner side of the curvature of the roof center reinforcement due to being bent at the bend portions.

DETAILED DISCLOSURE

Roof Center Reinforcement

Figure 1:
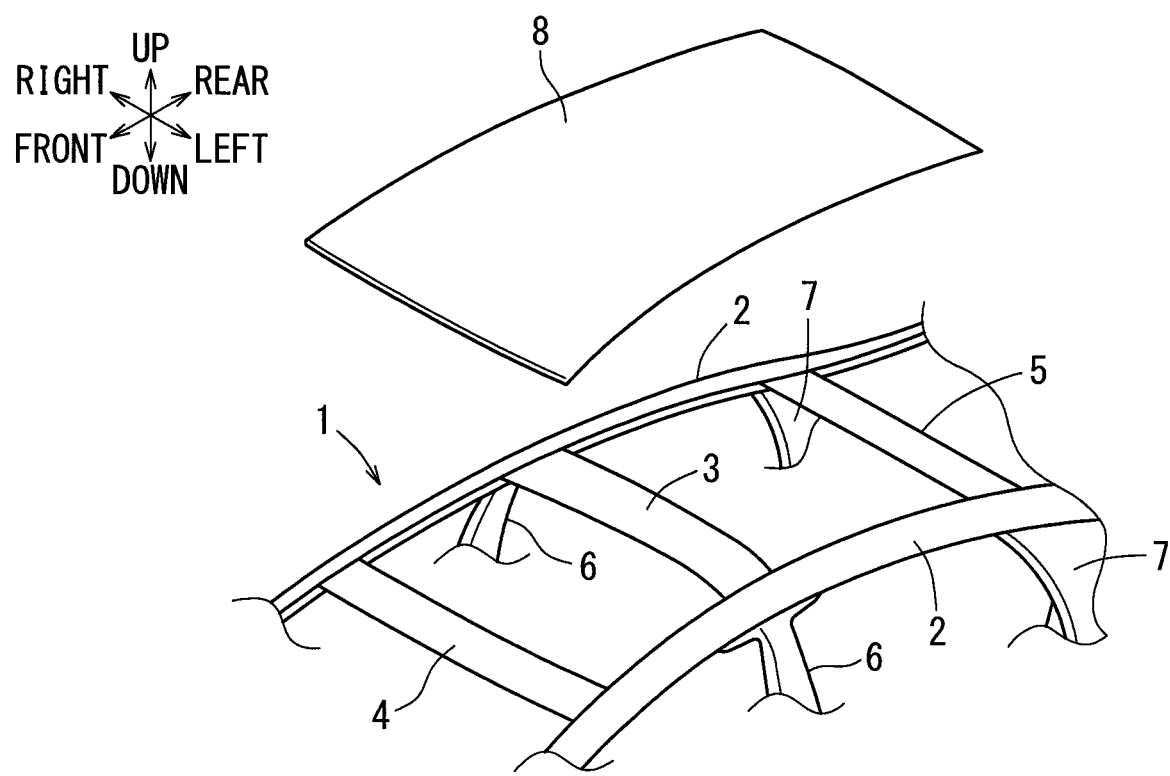
FIG. 1 is a perspective view of a roof center reinforcement according to one embodiment.

FIG. 1 shows a roof center reinforcement as an embodiment of the present disclosure. While the roof center reinforcement will be hereinafter described as an example, various features described below can be applied to various strengthening members or reinforcement members of a vehicle body, such as a strengthening member of a front bumper. FIG. 1 shows a framework structure of an upper portion of a vehicle body. As shown in FIG. 1, roof side rails 2 are provided on both the left and right sides of the vehicle 1. The left and right roof side rails 2 are supported from below by respective left and right front pillars (not shown), left and right center pillars 6, and left and right rear pillars 7. Between the left and right roof side rails 2, a transverse member known as a roof center reinforcement 3 is fixed between the left and right center pillars 6. Other transverse members, known as a front header 4 and a rear header 5, are fixed between the left and right roof side rails 2 behind and in front of the roof center reinforcement 3. Between the left and right roof side rails 2, a roof panel 8 is fixed, covering the front header 4, the roof center reinforcement 3, and the rear header 5.

Figure 2:
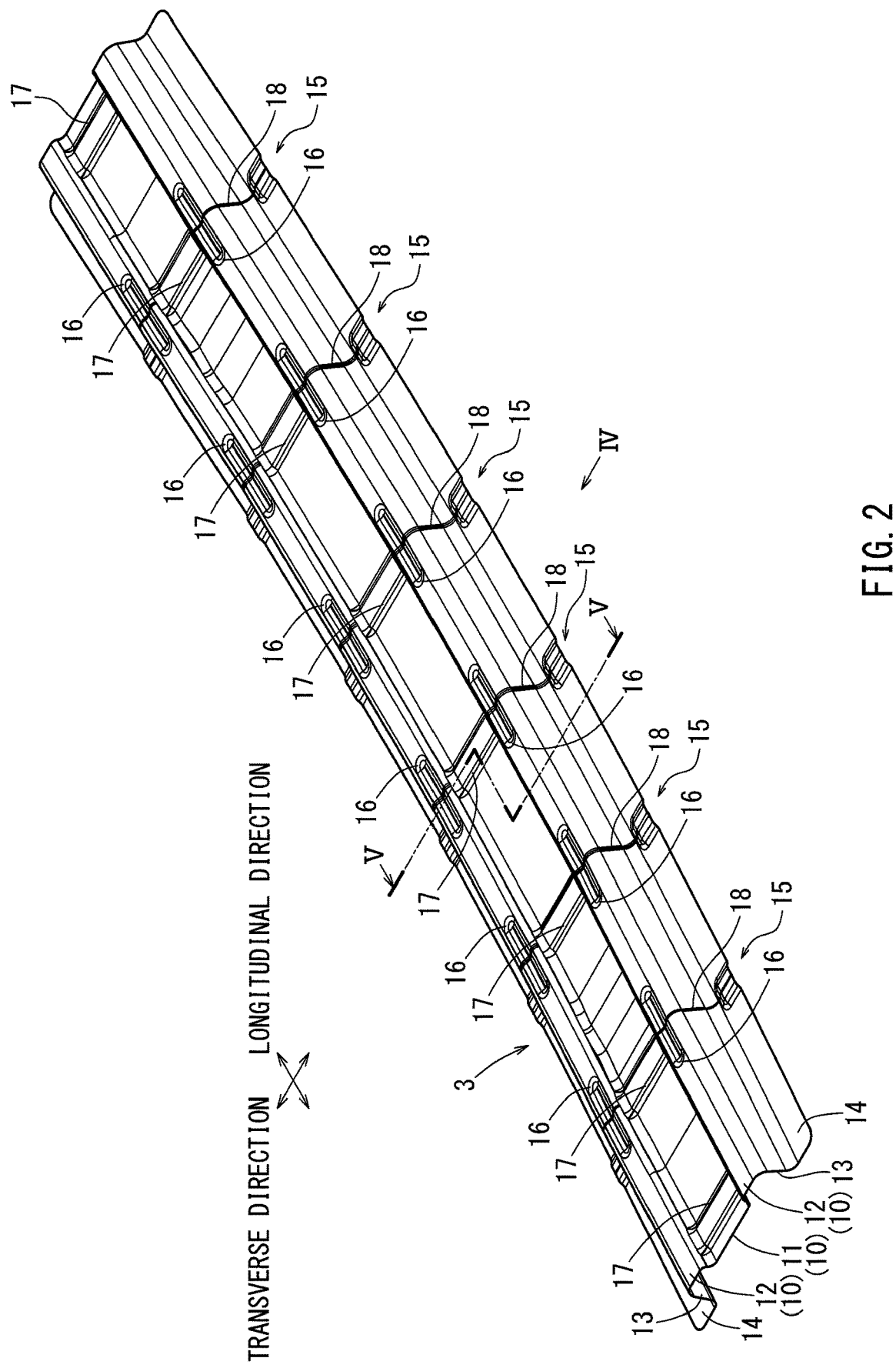
FIG. 2 is an enlarged perspective view of the roof center reinforcement of FIG. 1.
Figure 3:
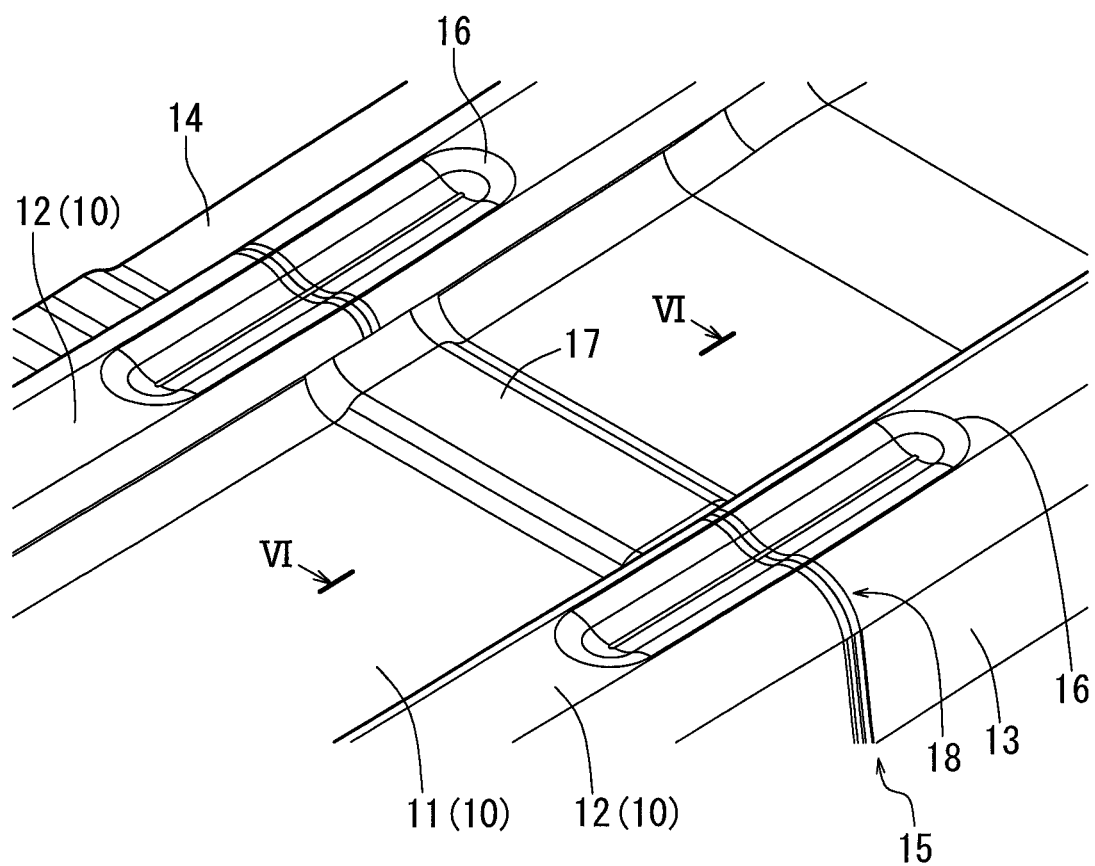
FIG. 3 is an enlarged perspective view of a bend portion of the roof center reinforcement of FIG. 1.
Figure 4:
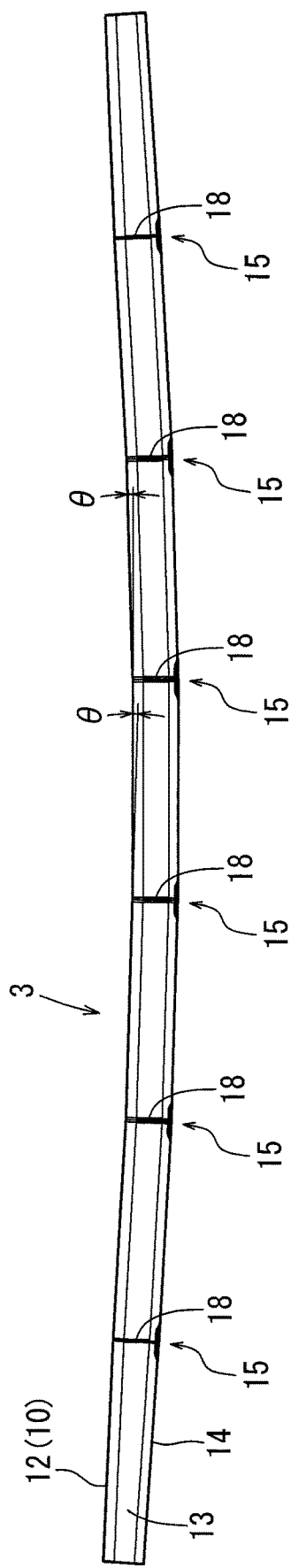
FIG. 4 is a view of the roof center reinforcement of FIG. 2 as seen along arrow IV of FIG. 2.
Figure 5:
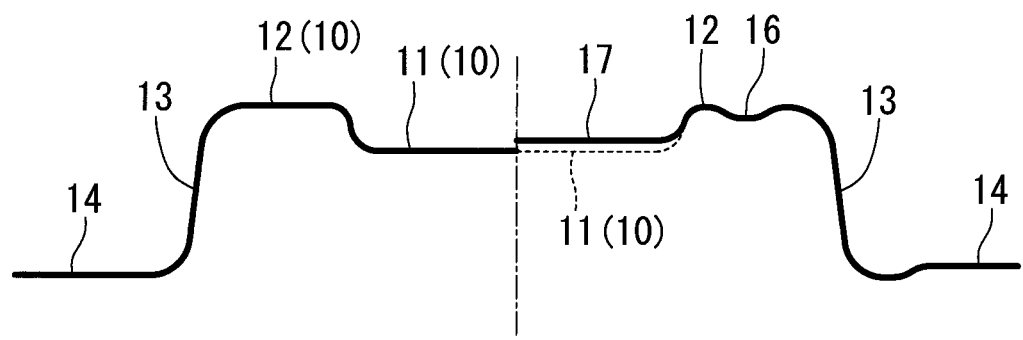
FIG. 5 is a cross-sectional view of the roof center reinforcement of FIG. 2 taken along line V-V of FIG. 2.

FIGS. 2 to 6 show the roof center reinforcement 3 in isolation. For convenience in explanation, the roof center reinforcement 3 is shown in FIGS. 2 to 6 upside down with respect to that shown in FIG. 1. As shown in FIG. 1, the roof center reinforcement 3 is arranged with its longitudinal side facing the left and right direction of the vehicle. As shown in FIGS. 2 and 5, the roof center reinforcement 3 has a generally hat-shaped cross section. Specifically, the roof center reinforcement 3 includes a top wall 10, a pair of lateral walls 13 extending from the lateral edges of the top wall 10, and a pair of flanges 14 extending from the edges of the lateral walls 13. The top wall 10 includes a recess 11 extending in the longitudinal direction and formed at the transverse center of the top wall 10. The top wall 10 thus includes ridges 12 extending in the longitudinal direction on both sides of the recess 11 of the top wall 10. The roof center reinforcement 3 may be formed, for example, by press forming a long sheet of high tensile strength steel (for example, with a tensile strength of about 1,180 MPa). The thickness of the high tensile strength steel sheet may be, for example, about 1.2 to 1.6 mm.

Bend Portions

As shown in FIG. 2 and FIG. 4, the roof center reinforcement 3 is curved as a whole by being bent at a plurality of bend portions 15, each of which is spaced apart along the longitudinal direction. The intervals between the bend portions may be constant; however, in other embodiments, the intervals may not be constant. The direction of curvature of the roof center reinforcement 3 is such that the top wall 10 is situated on the inner side of the curvature. The roof center reinforcement 3 is fixed to the left and right roof side rails 2 with the top wall 10 facing downward. As a result, the roof center reinforcement 3, when assembled to the vehicle body as shown in FIG. 1, is highest from the vehicle floor at its longitudinal center.

Figure 6:
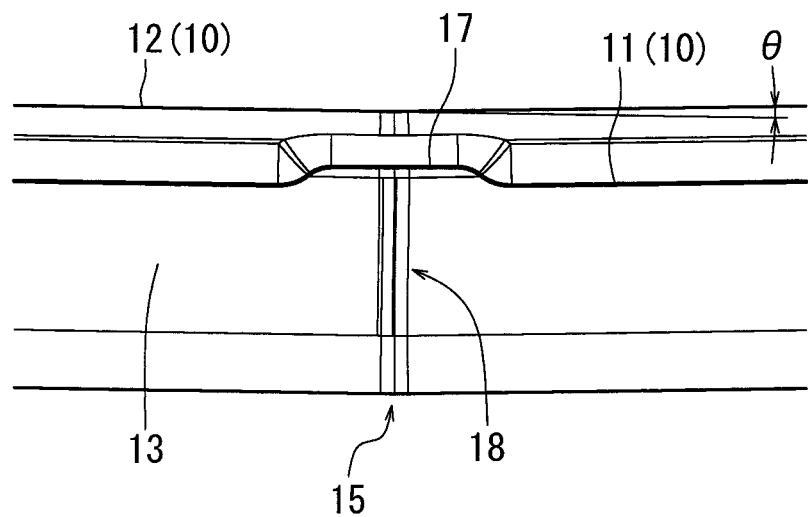
FIG. 6 is a sectional view of the bend portion of FIG. 3 taken along line VI-VI of FIG. 3.

As shown in FIGS. 4 and 6, the roof center reinforcement 3 is bent by an angle θ across the fold line 18 in each bend portion 15. The bending angle of each bend portion 15 may be determined so that the roof center reinforcement 3 has the desired curved shape as a whole. The bend portions 15 may be rounded so that the fold line 18 does not appear as a clear single line (the triple lines shown in the drawings represent the result of applying a fillet process with CAD software).

Recessed Beads

As shown in FIG. 3, the ridges 12 may include recessed beads 16, with their length extending in the longitudinal direction, positioned so as to correspond to associated bend portions 15. Each recessed bead 16 may be a depression in the ridge 12 such that the ridge 12 has a reduced height of protrusion at the transverse center of the ridge 12. The recessed beads 16 help increase the flexural rigidity of the roof center reinforcement 3 in the areas around the bend portions 15.

Raised Beads

The recessed portion 11 includes raised beads 17 protruding in the same direction as the ridges 12, each recessed portion 11 being positioned to correspond to an associated bend portion 15. Each raised bead 17 extends in the transverse direction of the roof center reinforcement 3. The raised beads 17 extend to supplement the fold line 18 of the bend portions 15. The two ends of the raised bead 17 are joined to a side of the associated ridge 12. Therefore, the raised beads 17 are situated between the two opposing recessed beads 16. The raised beads 17 thus formed increase the flexural rigidity of the roof center reinforcement 3 in the areas around the bend portion 15. As shown in FIG. 2, the longitudinal ends of the roof center reinforcement 3, where no bend portion 15 is provided, may each include a raised bead 17 similar to the raised bead 17 formed at the bend portion 15. This increases the flexural rigidity of the longitudinal ends of the roof center reinforcement 3. As shown in FIG. 3, the fold line 18 of each bend portion 15 is interrupted by the raised bead 17 whose top has a flat surface. The suppression of the fold line in the raised bead 17 may slightly increase the flexural rigidity of the roof center reinforcement 3 in the areas around the bend portions 15, as compared with the case where the fold line is formed in the raised bead 17.

Test on the Amount of Spring Back

Figure 11:
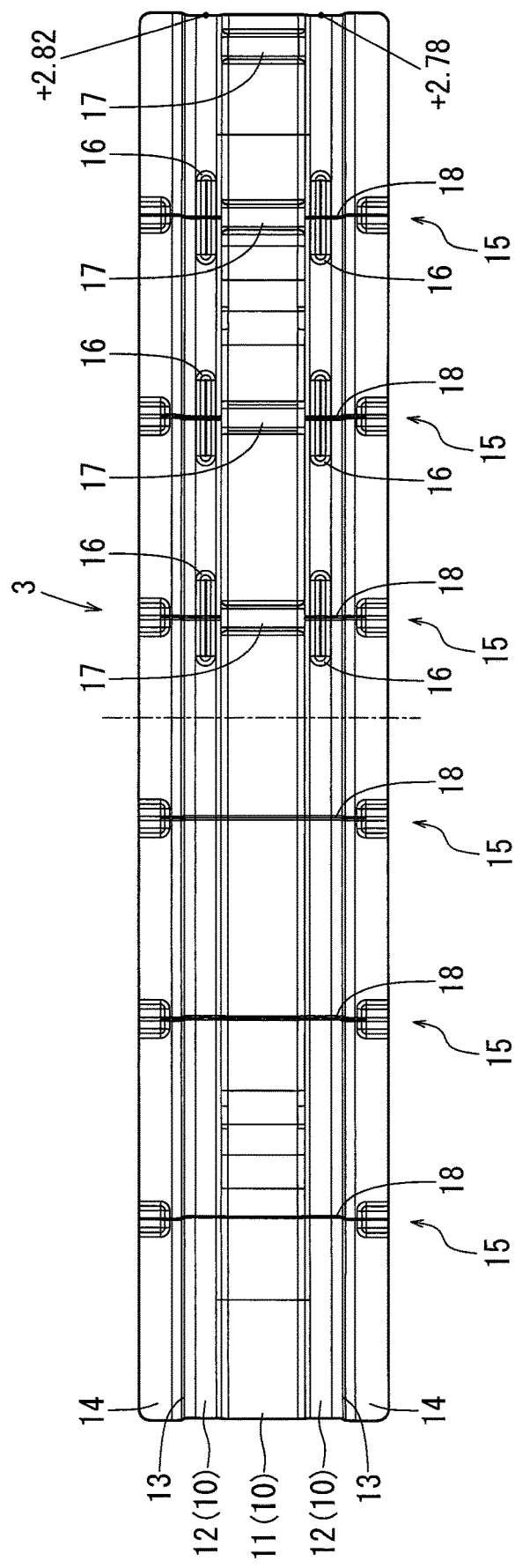
FIG. 11 is an illustrative view of the amount of reduced spring back of the roof center reinforcement of FIG. 1 in comparison with a comparative example.

Press forming of roof center reinforcements of several forms was simulated by a CAE (computer aided engineering) analysis, and the amount of spring back at their ends was compared. Each roof center reinforcement was press formed from a high tensile strength steel sheet with a tensile strength of 1,180 MPa, and having a length (in the longitudinal direction) of 1,000 mm, a width (in the transverse direction) of 17 mm, and a thickness of 1.4 mm. FIG. 11 depicts two roof center reinforcements prepared for comparison, drawn in combination for the sake of convenience, with the right side of the center line (shown by a dot-chain line) being the roof center reinforcement 3 of the embodiment configured as described above, and the left side of the center line being a roof center reinforcement of a comparative example. The comparative example does not include the above-described recessed beads 16 or raised beads 17. The numerical values indicated at two points in the right end of FIG. 11 represent the differences in the amount of spring back at those points between the two roof center reinforcements 3 after having been press formed. The press forming of each roof center reinforcement 3 was performed while the roof center reinforcement 3 was fixed at its center. Since the left and right of each roof center reinforcement 3 are generally symmetrical, it should be understood that, while not shown, the numerical values at the right end of each of the roof center reinforcements 3 of FIG. 11 similarly applies to the left end of each of the roof center reinforcements 3 of FIG. 11 as well. From these values, it was found that the amount of spring back in the roof center reinforcement 3 of the present embodiment (right side roof center reinforcement 3 of FIG. 11) was about 2.8 mm less than that of the comparative example (left side roof center reinforcement of FIG. 11). Therefore, the roof center reinforcement 3 of the present embodiment can be more accurately manufactured than the comparative example.

Figure 12:
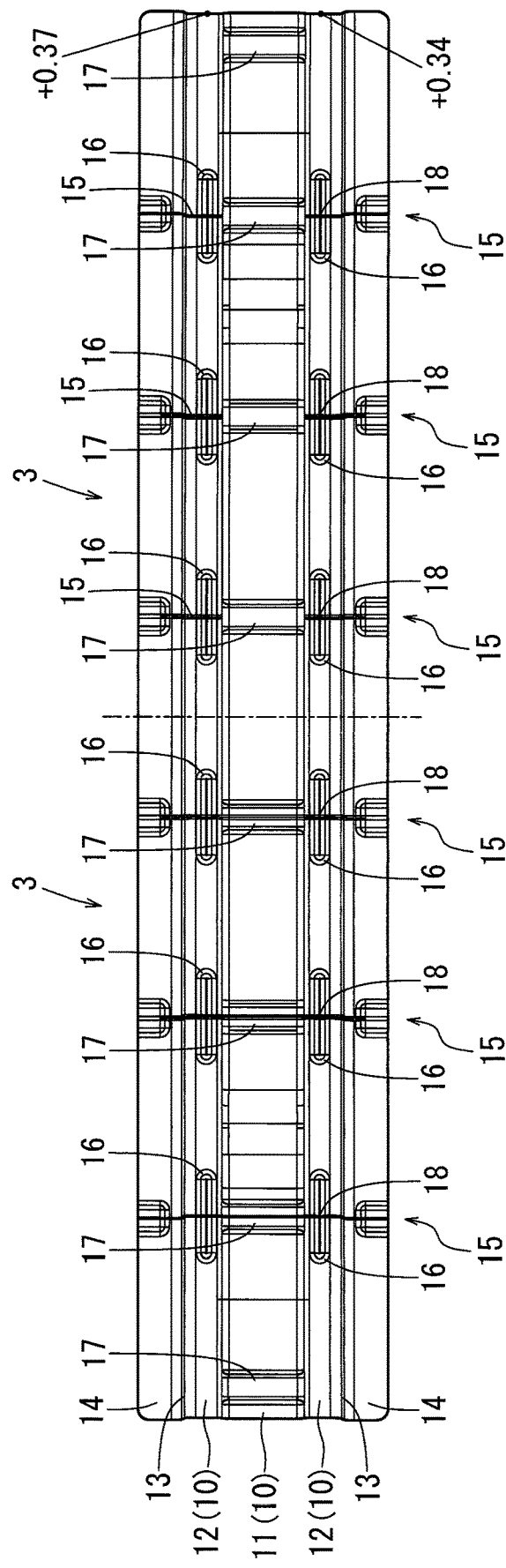
FIG. 12 is an illustrative view of the amount of reduced spring back of the roof center reinforcement of FIG. 1 in comparison with another comparative example.

FIG. 12 depicts another combination of roof center reinforcements, with the right side of the center line being the same as that of FIG. 11, but the left side of the center line showing a comparative roof center reinforcement in which the fold line 18 crosses the raised bead 17. From the numerical values indicated at the right end of FIG. 12, it was found that the amount of spring back in the roof center reinforcement 3 of the present embodiment (right side roof center reinforcement 3 of FIG. 12) was about 0.35 mm less on each side than the comparative example (left side roof center reinforcement 3 of FIG. 12). Therefore, in the present embodiment in which a fold line is not formed across the raised bead 17, the roof center reinforcement 3 can be manufactured with higher accuracy than the case where a fold line 18 is formed across the raised bead 17.

Double Raised Beads

Figure 7:
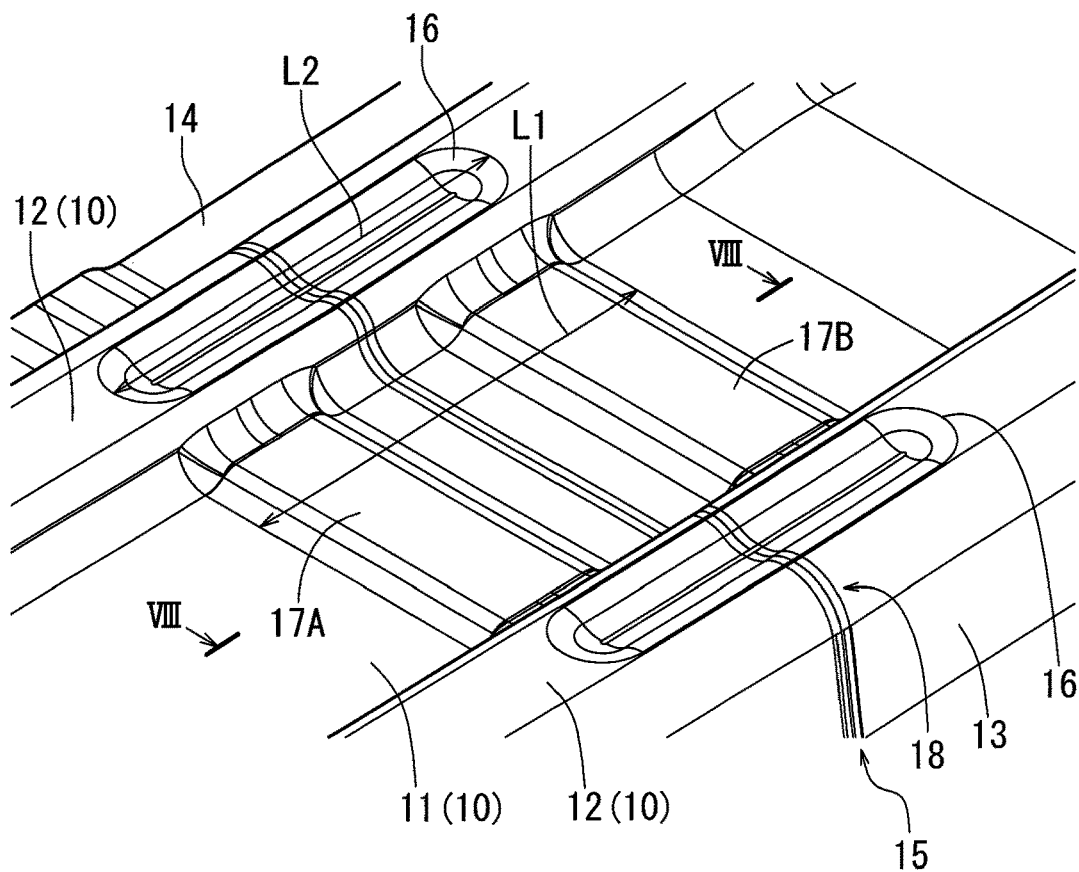
FIG. 7 is an enlarged perspective view of a bend portion of a roof center reinforcement as another embodiment, as compared to FIG. 3.
Figure 8:
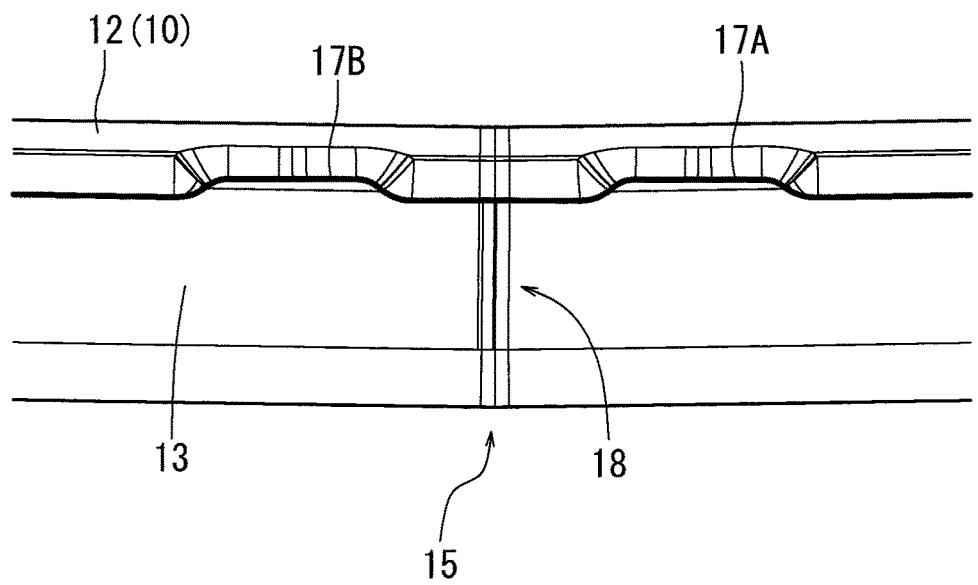
FIG. 8 is a cross-sectional view of the bend portion of FIG. 7 taken along line of FIG. 7.

As shown in FIGS. 7 and 8, each raised bead 17 may be replaced with a pair of raised beads 17a, 17b. Specifically, the two raised beads 17a, 17b are positioned across the bend portion 15 in the longitudinal direction of the roof center reinforcement 3. Each end of the two raised beads 17a, 17b is joined to a side of the associated ridge 12. As a result, the longitudinal dimension L1 of the area over which the two raised beads 17a, 17b are in the recess 11 is approximately the same as the longitudinal dimension L2 of the recessed beads 16.

Figure 13:
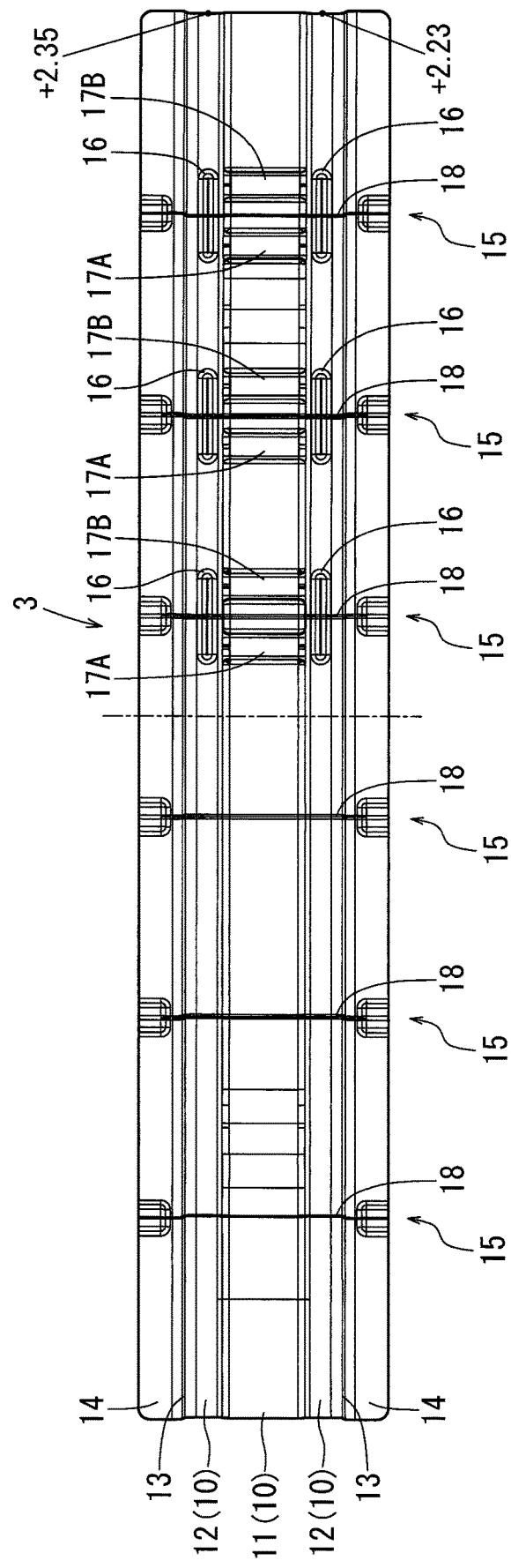
FIG. 13 is an illustrative view of the amount of reduced spring back of the roof center reinforcement of FIG. 7 in comparison with a comparative example.

FIG. 13 shows a roof center reinforcement 3 including the two raised beads (on the right side), drawn in combination with a comparative roof center reinforcement with neither recessed beads 16 nor raised beads 17 (on the left side). From the numerical values indicated at the right end of FIG. 13, the roof center reinforcement 3 of the present embodiment shows that the amount of spring back is about 2.3 mm less on each side than that of the comparative example. Therefore, the roof center reinforcement 3 of the present embodiment can be more accurately manufactured than the comparative example.

Omission of the Recessed Beads

Figure 9:
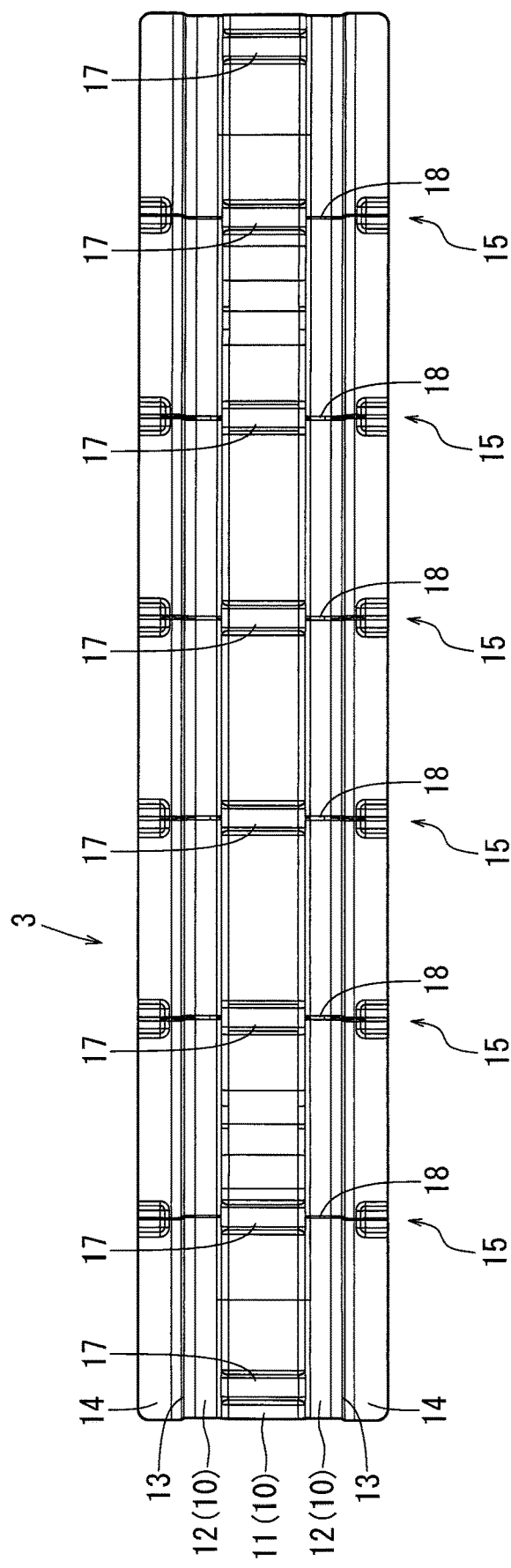
FIG. 9 is a plan view of a roof center reinforcement as another embodiment.

As shown in FIG. 9, the recessed bead 16 may be omitted. In this case, raised beads 17 similar to those in the above-described embodiment of FIG. 2 may still be included in each of the corresponding bend portions 15.

Figure 14:
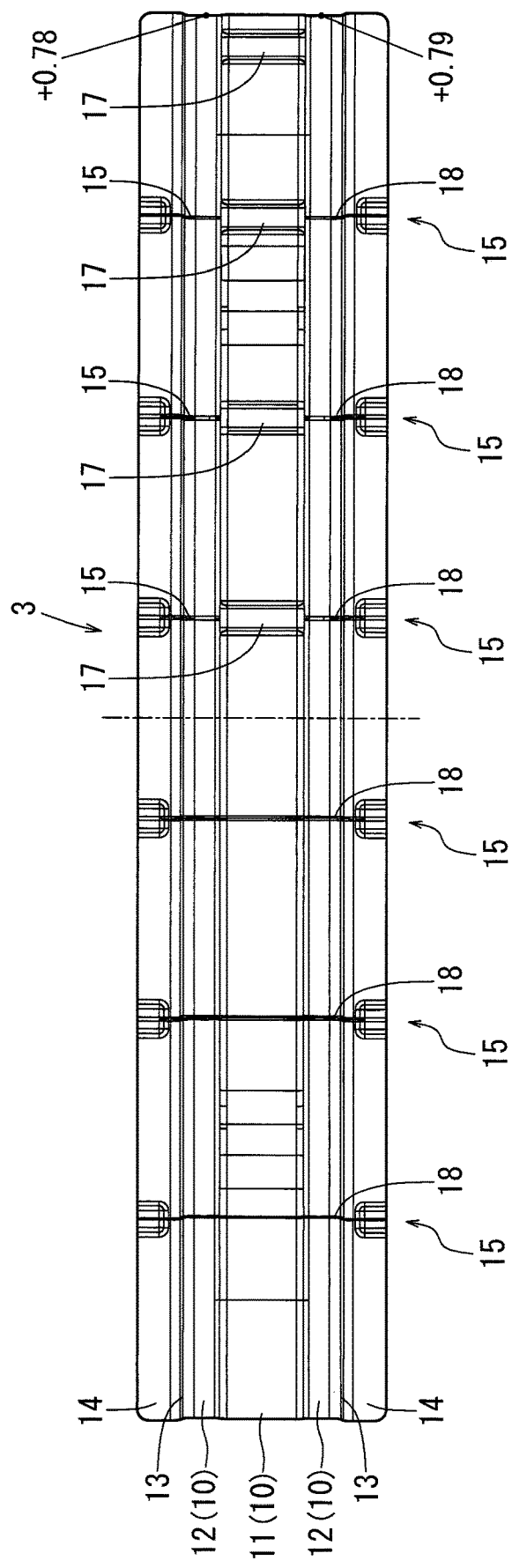
FIG. 14 is an illustrative view of the amount of reduced spring back of the roof center reinforcement of FIG. 9 in comparison with a comparative example.

FIG. 14 shows a roof center reinforcement 3 with no recessed beads 16 (on the right side of the center line), drawn in combination with a comparative roof center reinforcement with neither recessed beads 16 nor raised beads 17 (on the left side of the center line). From the numerical values indicated at the right end of FIG. 14, it was found that the amount of spring back of the roof center reinforcement 3 of the present embodiment is about 0.8 mm less on each side as compared to the comparative example. Therefore, in the present embodiment, the roof center reinforcement 3 can be more accurately manufactured than the comparative example.

Cross-Shaped Raised Beads

Figure 10:
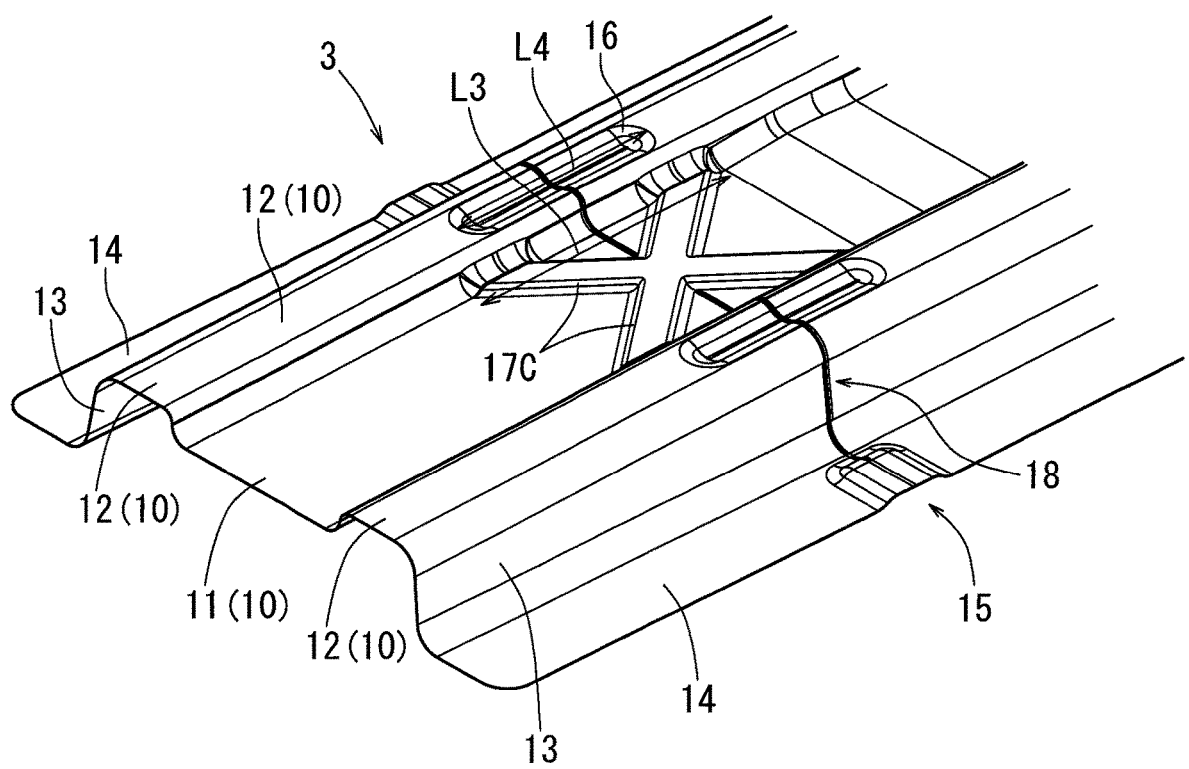
FIG. 10 is an enlarged perspective view of a bend portion of a roof center reinforcement as another embodiment, as compared to FIG. 3.

As shown in FIG. 10, each raised bead 17 may be replaced with a cross-shaped raised bead 17c with its intersection at the bend portion 15 of the recess 11. Specifically, the cross-shaped raised bead 17c has the shape of a cross with its intersection at the bend portion 15 of the recess 11, and with each end joined to a side of the associated ridge 12. As a result, the longitudinal dimension L3 of the area over which the raised bead 17c extends in the recessed portion 11 is slightly larger than, but nearly equal to, the longitudinal dimension L4 of the recessed bead 16.

While not shown, the amount of spring back when the roof center reinforcement 3 of FIG. 9 was press formed was approximately the same as that of the embodiment of FIG. 7. Therefore, the roof center reinforcement 3 of the present embodiment can be more accurately manufactured than a comparative example.

Advantages of the Embodiments

The embodiments described above have at least the following advantages.

In the above-described embodiments, the raised bead 17 is included in an area corresponding to the bend portion 15, thereby leading to an increased flexural rigidity in the areas around the bend portions 15. This reduces the amount of spring back when the vehicle strengthening member (e.g., a roof center reinforcement 3) is press formed, as compared with the case where no raised beads 17 are formed. The raised bead 17 also reduces the variation of the amount of spring back. As a result, the vehicle strengthening member can be manufactured with higher accuracy.

In some embodiments, a recessed bead 16 is further included in the ridge 12 in an area corresponding to the bend portion 15. This increases the flexural rigidity in the areas around the bend portions 15. This reduces the amount of spring back when the vehicle strengthening member (e.g., the roof center reinforcement 3) is press formed, as compared with the case where no recessed beads 16 are formed. The recessed beads 16 also reduce the variation in the amount of spring back. As a result, the vehicle strengthening member can be manufactured more accurately.

In some embodiments, one raised bead 17 is positioned to supplement the fold line 18 of the bend portion 15 between the recessed beads 16. The raised bead 17 therefore reliably functions to ensure an increased flexural rigidity in the areas around the bend portions 15. This reduces the amount of spring back when the vehicle strengthening member (e.g., the roof center reinforcement 3) is press formed, leading to a higher accuracy with which the vehicle strengthening member can be manufactured.

In some embodiments, the top of the raised bead 17 has a flat surface. This increases the flexural rigidity in the areas around the bend portions 15, as compared with the case where the fold line of the bend portion 15 passes through the top of the raised bead 17. This reduces the amount of spring back when the vehicle strengthening member (e.g., the roof center reinforcement 3) is press formed, as compared with the case where the fold line passes through the top of the raised bead 17. This also reduces the variation in the amount of spring back. As a result, the vehicle strengthening member can be manufactured more accurately.

In some embodiments, even when the fold line of the bend portion 15 extends across the recessed portion 11, two raised beads 17a, 17b are formed on either side the fold line. This leads to an increased flexural rigidity in the areas around the bend portion 15. This also reduces the amount of spring back when the vehicle strengthening member (e.g., the roof center reinforcement 3) is press formed, as compared with the case where no raised beads 17a, 17b are formed. The raised beads 17a, 17b also reduce the variation in the amount of spring back. As a result, the vehicle strengthening member can be manufactured with higher accuracy.

In some embodiments, the raised beads 17, 17A, 17B, 17C are formed in areas corresponding to the bend portion 15 of the roof center reinforcement 3. This reduces the amount of spring back when the roof center reinforcement 3 is press formed, thereby leading to a higher accuracy with which the roof center reinforcement 3 can be manufactured.

While the specific embodiments have been described above, the present disclosure is not limited to these embodiments, and various modifications, substitutions, additions, and/or omissions can be made by those skilled in the art.

What is claimed is:

1. A vehicle strengthening member, comprising:
    a pair of horizontal flanges extending horizontally;
    a top wall and a pair of lateral walls extending downward from the top wall, each of the lateral walls extending from the top wall to a respective horizontal flange so that the vehicle strengthening member has a concave cross section that extends upward from the pair of horizontal flanges with a cavity defined between the pair of lateral walls and the top wall; and
    a plurality of bend portions each of which is bent along a fold line extending in a transverse direction of the vehicle strengthening member so that the vehicle strengthening member is curved as a whole,
wherein the top wall comprises:
a recess extending in a longitudinal direction of the vehicle strengthening member and along a center of the top wall,
a pair of ridges extending in the longitudinal direction on opposite lateral sides of the recess, and
a plurality of raised beads, each of which is joined to the pair of ridges and extends across the recess in an associated bend portion, and
wherein each of the pair of ridges comprises a recessed bead extending along the longitudinal direction at a position corresponding to each of the bend portions.

2. The vehicle strengthening member of claim 1, wherein:
at each of the bend portions, one raised bead of the plurality of raised beads extends along the fold line.

3. The vehicle strengthening member of claim 1, wherein:
the fold line of each of the bend portions is interrupted by the corresponding raised bead, and
a top of each raised bead comprises a flat surface.

4. The vehicle strengthening member of claim 1, wherein:
in at least one of the bend portions, a second raised bead is positioned between the two recessed beads associated with the same bend portion, and
the two raised beads in the same bend portion are disposed on opposite sides of the corresponding fold line.

5. The vehicle strengthening member of claim 1, wherein:
the vehicle strengthening member is a roof center reinforcement, and
the top wall is positioned on an inner side of the curvature of the roof center reinforcement by being bent at the bend portions.

6. A vehicle strengthening member, comprising:
a top wall having a first ridge and a second ridge, the first ridge and the second ridge extending in a longitudinal direction;
a first lateral wall protruding from the first ridge of the top wall, the first lateral wall primarily extending in the longitudinal direction;
a second lateral wall protruding from second ridge of the top wall, the second lateral wall extending primarily in the longitudinal direction;
a recess formed in the top wall, the recess extending in the longitudinal direction and between the first ridge and the second ridge;
a first bend portion extending in a transverse direction perpendicular to the longitudinal direction so that the top wall is curved as a whole,
wherein the first bend portion comprises:
a first raised bead traversing the recess from the first ridge to the second ridge,
wherein:
the first bent portion further comprises a first fold line and a second fold line,
the first fold line primarily extends in the transverse direction and traverses the first ridge and the first lateral wall, and
the second fold line primarily extends in the transverse direction and traverses the second ridge and the second lateral wall.

7. The vehicle strengthening member of claim 6, wherein the first raised bead is positioned entirely within the recess.

8. The vehicle strengthening member of claim 6, wherein the first raised bead extends primarily in the transverse direction.

9. The vehicle strengthening member of claim 6, wherein neither the first fold line nor the second fold line extend to an upper surface of the first raised bead.

10. The vehicle strengthening member of claim 6, wherein the first fold line and the second fold line are aligned with each other and with the first raised bead in the transverse direction.

11. A vehicle strengthening member, comprising:
a top wall having a first ridge and a second ridge, the first ridge and the second ridge extending in a longitudinal direction;
a first lateral wall protruding from the first ridge of the top wall, the first lateral wall primarily extending in the longitudinal direction;
a second lateral wall protruding from second ridge of the top wall, the second lateral wall extending primarily in the longitudinal direction;
a recess formed in the top wall, the recess extending in the longitudinal direction and between the first ridge and the second ridge;
a first bend portion extending in a transverse direction perpendicular to the longitudinal direction so that the top wall is curved as a whole,
wherein the first bend portion comprises:
a first raised bead traversing the recess from the first ridge to the second ridge,
wherein:
the bend portion further comprises a fold line extending primarily in the transverse direction,
the fold line traverses the first lateral wall, the first ridge, the recess, the second ridge, and the second lateral wall, and
the fold line does not traverse an upper surface of the first raised bead.

12. The vehicle strengthening member of claim 11, further comprising a second raised bead, wherein:
the second raised bead traverses the recess from the first ridge to the second ridge, and
the fold line traverses the recess between the first raised bead and the second raised bead.

13. The vehicle strengthening member of claim 11, wherein the bend portion further comprises:
a first recess bead formed in the first ridge, the first recess bead extending primarily in the longitudinal direction, and
a second recess bead formed in the second ridge, the second recess bead extending primarily in the longitudinal direction.

14. The vehicle strengthening member of claim 13, wherein:
the first bent portion further comprises a first fold line and a second fold line,
the first fold line primarily extends in the transverse direction and traverses the first ridge, the first lateral wall, and the first recess bead, and
the second fold line primarily extends in the transverse direction and traverses the second ridge, the second lateral wall, and the second recessed bead.

15. The vehicle strengthening member of claim 11, further comprising a second raised bead, wherein:
the second raised bead traverses the recess from the first ridge to the second ridge,
the second raised bead intersects the first raised bead at approximately the center of the recess in the transverse direction.

16. The vehicle strengthening member of claim 6, wherein the bend portion further comprises:
- a first recess bead formed in the first ridge, the first recess bead extending primarily in the longitudinal direction, and
- a second recess bead formed in the second ridge, the second recess bead extending primarily in the longitudinal direction.

17. The vehicle strengthening member of claim 16, wherein:
- the first bent portion further comprises a first fold line and a second fold line,
- the first fold line primarily extends in the transverse direction and traverses the first ridge, the first lateral wall, and the first recess bead, and
- the second fold line primarily extends in the transverse direction and traverses the second ridge, the second lateral wall, and the second recessed bead.

18. The vehicle strengthening member of claim 6, further comprising a second raised bead, wherein:
- the second raised bead traverses the recess from the first ridge to the second ridge,
- the second raised bead intersects the first raised bead at approximately the center of the recess in the transverse direction.

19. The vehicle strengthening member of claim 11, wherein the first raised bead is positioned entirely within the recess.

20. The vehicle strengthening member of claim 11, wherein the first raised bead extends primarily in the transverse direction.

* * * * *